United States Patent
Farney et al.

(10) Patent No.: US 12,287,401 B2
(45) Date of Patent: Apr. 29, 2025

(54) SYSTEMS AND METHODS FOR WEATHER RADAR PROCESSING

(71) Applicant: Insurance Services Office, Inc., Jersey City, NJ (US)

(72) Inventors: Tory Farney, Acton, MA (US); Scott Ganson, Lee's Summit, MO (US); Nick Guy, Bainbridge Island, WA (US)

(73) Assignee: Insurance Services Office, Inc., Jersey City, NJ (US)

( * ) Notice: Subject to any disclaimer, the term of this patent is extended or adjusted under 35 U.S.C. 154(b) by 198 days.

(21) Appl. No.: 16/570,889

(22) Filed: Sep. 13, 2019

(65) Prior Publication Data

US 2021/0080569 A1    Mar. 18, 2021

(51) Int. Cl.
| | |
|---|---|
| *G01S 13/95* | (2006.01) |
| *G01S 7/02* | (2006.01) |
| *G01S 7/41* | (2006.01) |
| *G01S 13/53* | (2006.01) |
| *G01W 1/10* | (2006.01) |
| *G06N 7/02* | (2006.01) |

(52) U.S. Cl.
CPC ............ *G01S 13/951* (2013.01); *G01S 7/024* (2013.01); *G01S 7/41* (2013.01); *G01S 13/53* (2013.01); *G01W 1/10* (2013.01); *G06N 7/02* (2013.01)

(58) Field of Classification Search
CPC .......... G01S 13/951; G01S 7/024; G01S 7/41; G01S 13/53; G01W 1/10; G06N 7/02
See application file for complete search history.

(56) References Cited

U.S. PATENT DOCUMENTS

| | | | | |
|---|---|---|---|---|
| 6,377,204 B1 * | 4/2002 | Wurman | ............... | G01S 13/003 342/75 |
| 8,054,214 B2 * | 11/2011 | Bunch | ..................... | G01S 7/003 342/26 B |
| 10,324,180 B1 * | 6/2019 | Lawton | ................ | G01S 13/958 342/26 |
| 2001/0013839 A1 * | 8/2001 | Wurman | ............... | G01S 13/951 342/26 R |

(Continued)

OTHER PUBLICATIONS

John M. Krause, A Simple Algorithm to Discriminate between Meteorological and Nonmeteorological Radar Echoes, Sep. 2016, American Meteorological Society, vol. 33, pp. 1875-1884 (Year: 2016).*

(Continued)

*Primary Examiner* — Peter M Bythrow
*Assistant Examiner* — Nazra Nur Waheed
(74) *Attorney, Agent, or Firm* — McCarter & English, LLP

(57) ABSTRACT

Systems and methods for weather radar processing, comprising a processor in communication with a first database and a second database and computer system code executed by the processor. The computer system code causes the processor to ingest radar data from the first database and ingest numerical weather prediction data from the second database. The processor further processes the radar data and the numerical weather prediction data to generate weather products on defined tiles. The processor further processes the weather products on the defined tiles to generate full domain (stitch-tile) data and generates time aggregation data based on the stitch-tile data. The processor further generates a final model using the time aggregation data.

22 Claims, 16 Drawing Sheets

(56) References Cited

U.S. PATENT DOCUMENTS

| | | | |
|---|---|---|---|
| 2014/0176362 A1* | 6/2014 | Sneed | G01S 13/95 342/26 |
| 2015/0309208 A1* | 4/2015 | Sneed | G01W 1/14 702/3 |
| 2015/0145717 A1* | 5/2015 | Lim | G01S 7/292 342/26 R |
| 2019/0064346 A1* | 2/2019 | Jones | G01S 13/95 702/3 |
| 2019/0340940 A1* | 11/2019 | Elkabetz | G08G 5/025 |

OTHER PUBLICATIONS

Krause, J. M. (2016). A Simple Algorithm to Discriminate between Meteorological and Nonmeteorological Radar Echoes, Journal of Atmospheric and Oceanic Technology, 33(9), 1875-1885. (Year: 2016).*

Ganson, et al., "Verisk Radar Processing Pipeline: A First Glance," poster presented at the 39th Conference on Radar Meteorology (also known as the American Meteorological Society (AMS) Radar Conference), Sep. 15-20, 2019 (1 page).

Ganson, et al., "R20 Hail Products," presentation presented at the 39th Conference on Radar Meteorology (also known as the American Meteorological Society (AMS) Radar Conference), Sep. 15-20, 2019 (15 pages).

Witt, et al., "An Enhanced Hail Detection Algorithm for the WSR-88D," Weather and Forecasting, Jun. 1998 (18 pages).

Ryzhkov, et al., "Polarimetric Radar Characteristics of Melting Hail. Part II: Practical Implications," Journal of Applied Meteorology and Climatology (2013) (16 pages).

Ortega, et al., "Polarimetric Radar Characteristics of Melting Hail. Part III: Validation of the Algorithm for Hail Size Discrimination," Journal of Applied Meteorology and Climatology, Apr. 2016 (20 pages).

Park, et al., "The Hydrometeor Classification Algorithm for the Polarimetric WSR-88D: Description and Application to an MCS," Weather and Foreceasting (2009) (19 pages).

Wang, et al., "Algorithm for Estimation of the Specific Differential Phase," Journal of Atmospheric and Oceanic Technology, Dec. 2009, (14 pages).

Gdeisat, et al., "One-Dimensional Phase Unwrapping Problem," available at https://www.ljmu.ac.uk/~/media/files/ljmu/ about-US/faculties-and-schools/fet/geri/onedimensionalphaseunwrapping_finalpdf.pdf?la=en. accessed on Aug. 7, 2019 (11 pages).

Helmus, et al., "The Pythod ARM Radar Toolkit (Py-ART), a Library for Working with Weather Radar Data in the Python Programming Language," Journal of Open Research Software (2016) (6 pages).

Boodoo, et al., "Application of Dual-Polarization Radar Melting-Layer Detection Algorithm," Journal of Applied Meteorology and Climatology, Aug. 2010 (15 pages).

Cifelli, et al., "A New Dual-Polarization Radar Rainfall Algorithm: Application in Colorado Precipitation Events," Journal of Atmospheric and Oceanic Technology, Mar. 2011 (13 page).

Kelager, "Lagrangian Fluid Dynamics Using Smoothed Particle Hydrodynamics," Copenhagen, 2006 (88 pages).

Giangrande, et al., "Automatic Designation of the Melting Layer with a Polarimetric Prototype of the WSR-88D Radar," Journal of Applied Meteorology and Climatology, May 2008 (11 pages).

CSU-Radarmet/CSU RAdar Tools: A Module of Independent Functions to do Precipitation Retrievals from Polarimetric Radar Data - < https://github.com/CSU-Radarmet/CSU_RadarTools> - Internet Wayback Machine screen capture of website dated Jun. 11, 2018 (5 pages).

The Python ARM Radar Toolkit - Py-ART - < https://arm-doe.github.io/pyart/> - Internet Wayback Machine screen capture of website dated Oct. 1, 2014 (6 pages).

* cited by examiner

SYSTEMS AND METHODS FOR WEATHER RADAR PROCESSING

BACKGROUND

Technical Field

The present disclosure relates generally to the field of weather prediction technology. More specifically, the present disclosure relates to systems and methods for weather radar processing.

Related Art

Severe weather is any dangerous meteorological phenomena capable of causing damage, injury, or loss of life. Type of severe weather can vary depending on latitude, altitude, topography, and atmospheric conditions. Types of severe weather can include hail, high winds, thunderstorms, tornados, blizzards, and ice storms.

Hail, for example, is a form of solid precipitation that consists of balls or lumps of ice, and is generally possible with thunderstorms. Existing methods for detecting hail-producing thunderstorms use weather satellites and weather radar imagery. However, these methods are limited in their accuracy and are unable to predict more specific properties of the hail in each storm, and require vast computational expense. This leads to uncertainty regarding whether hail from a storm is life-threatening, or what scope of damage can be produced by said storm, as well as high costs.

Therefore, there is a need for systems and methods which can determine certain severe weather parameters, such as, but not limited to, hail probability, hail size, and hail duration, while improving processing speed and decreasing computational expense. These and other needs are addressed by the systems and methods of the present disclosure.

SUMMARY

The present disclosure relates to systems and methods for weather radar processing. The system ingests radar data from a database. The radar data is collected into a radar volume and stored in a storage system. The system further ingests numerical weather prediction ("NWP") data from a NWP model data database. The system then processes the radar data and the NWP model data to compute weather products. To compute the weather products, the system can process data at a regional-level, producing data related to but not limited to radar reflectivity and certain hail attributes. The system combines the computed weather products at a regional-level back into a full domain product by stitching the individual regions together. The system then performs a time aggregation of the stitched tiles and processes the time-aggregated output to develop a final output solution.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to systems and methods for weather radar processing, as described in detail below in connection with FIGS. 1-16. The systems and methods of the present disclosure provide for weather radar processing using parallelization and the processing benefits of cloud computing resources. These systems and methods offer a significant reduction in computational expense and time consumption, along with improvements in prediction accuracy and prediction capabilities.

Figure 1:
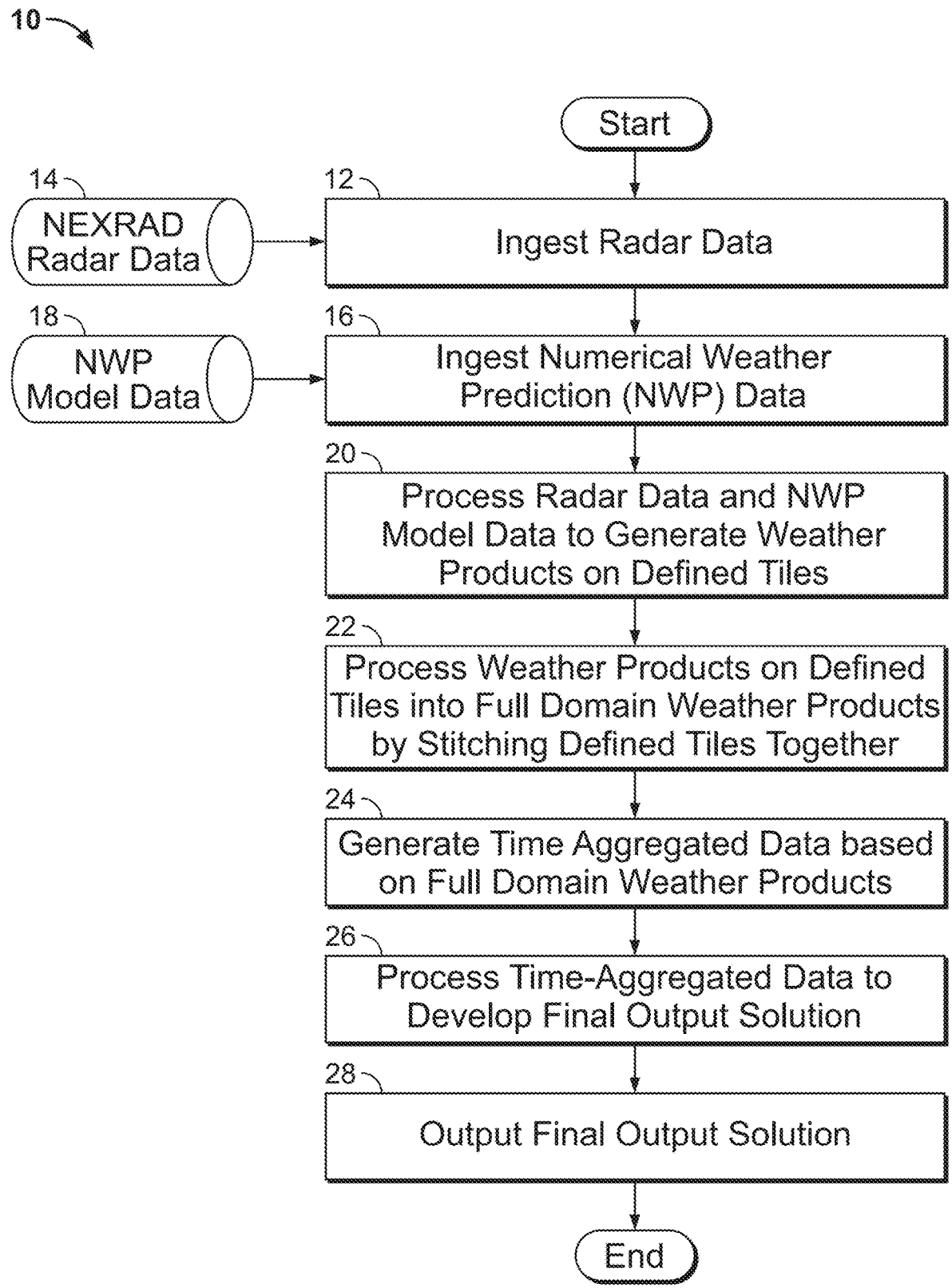
FIG. 1 is a flowchart illustrating the overall process steps carried out by the system of the present disclosure.

FIG. 1 is a flowchart illustrating the overall process steps carried out by the system of the present disclosure, indicated generally at method 10. In step 12, the system ingests radar data from a database. For example, the system can ingest radar data from a Next Generation Weather Radar ("NEXRAD") database 14, which is available from the National Oceanic and Atmospheric Administration ("NOAA"). The radar data can be accessed through a local data manager ("LDM") feed, which allows access to a ray-by-ray data broadcast in real-time. A secondary LDM feed can back up the broadcast. The radar data is collected into a radar volume (a three dimensional ("3D") representation of the radar data) and stored in a storage system, such as a hard-drive, a cloud storage system (e.g., Amazon® Simple Storage Service). The radar data can be stored/uploaded to/by the system using a database management software, such as Unidata. Other radar data can be ingested, such as from Canadian radar networks, European radar networks, Asian radar networks, etc.

In step 16, the system ingests numerical weather prediction ("NWP") data from a NWP model data database 18. For example, the NWP model data can include 00-06 forecast hours for the National Center for Environmental Prediction ("NCEP") Rapid Update ("RAP") model data, which can be retrieved by the system for each hourly run from an NCEP file transfer protocol ("FTP") and saved to the cloud storage system. In another example, the system can also retrieve NOAA High Resolution Rapid Refresh ("HRRR") model data. Specifically, the system can retrieve 00-02 forecast hours for each hourly run of the HRRR from the National Model Archive and Distribution System ("NOMADS") and save this data to the cloud storage system. It is noted that both sets of model data are cloud-resolving and convection-allowing models. The RAP model is 13 km resolution, and the HRRR model is 3 km resolution. Of course, the system can ingest any type of NWP data with a minimal amount of reconfiguration.

By way of example, the system is focused on the contiguous United States ("CONUS") and receives an amount of input data per day from weather radar data. Additionally, an amount of RAP data and HRRR data can be retrieved per day. The present system is expandable to the remainder of the United States and flexible to allow input from international data sources.

In step 20, the system processes the radar data and the NWP model data to compute weather products. To compute the weather products, the system can process data that are combined into defined regions and create variable specific output databases as defined by step 16 to include, but not limited to, a radar reflectivity database output, a polarimetric hail size database output, a polarimetric hail time database output, a non-polarimetric specific hail index database output, and a warning threshold database output.

In step 22, the system processes the computed weather products to stitch tiles. To generate the stitched tiles, the system combines the databases from all applicable regions to spatially aggregate the data into full domain databases. In step 24, the system performs a time aggregation of the stitched tiles. In this step, the system combines multiple stitch tiles databases to temporally aggregate data. In step 26, the system processes the time-aggregated output to develop a final output solution. To develop the final output solution, the system can process output data from stich tiles into any final output solution data format, such as but not limited to NetCDF and Shapefile products, and time resolution, such as but not limited to hourly or daily. In step 28, the system outputs the final output solution. The foregoing steps will be discussed in greater detail below.

Figure 2:
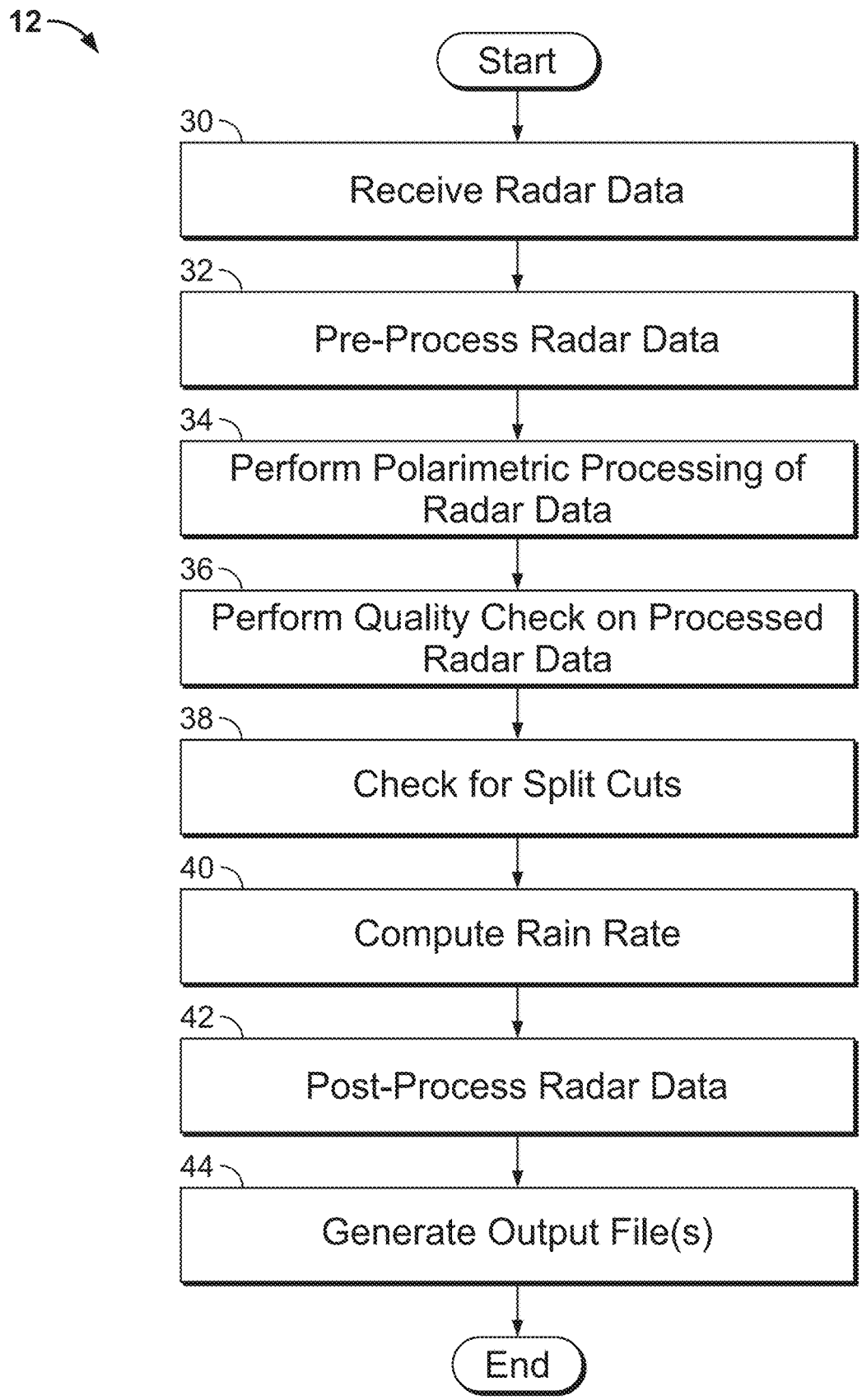
FIG. 2 is a flowchart illustrating step 12 of FIG. 1 in greater detail.

FIG. 2 is a flowchart illustrating step 12 of FIG. 1 in greater detail. In step 30, the system receives radar data. As discussed above, the radar data can include a single volume of data (e.g., input data volume), from a single radar site as input. Step 30 can be triggered by the appearance of a new weather radar file in the NEXRAD database 14, or any other database used by the present system. Multiple weather radar files can be processed at the same time by batching jobs to individual worker computing instances.

In step 32, the system pre-processes the radar data. Specifically, the system checks for reflectivity and velocity fields, for valid elevation data, for a station ID in metadata (or uses a filename), if the data is polarimetric, and azimuth data. More specifically, the input data volume is checked for a minimum number of fields needed for processing. The system performs a complete scan, which acts to disregard partial files that may be created due to a change in scan strategy of a local Weather Forecast Office that controls each NEXRAD measurement strategy. If radar elevation (e.g., tilt) data is not included, the volume is also rejected. The radar data are then examined to determine whether they contain polarimetric information.

If the radar data is polarimetric (e.g., contains polarimetric information), the system performs polarimetric processing of the radar data in step 34. First, the system adjusts/corrects a system phase using a ray-by-ray external scatterer method to determine an initial system differential phase ("ISDP"). The scatterer method can use a precipitation filter (e.g., light, medium, etc.). The scatterer method can also process data to remove a non-meteorological echo and data too close to a radar.

Unfolding is also performed by the system to generate differential phase ("$\Phi_{DP}$") data. A differential reflectivity ("$Z_{DR}$") is examined to compute a volume bias value, which the system then compares to a running 24-hour history to determine an amount of adjustment required for a $Z_{DR}$ field. The volume bias value can be appended for future analyses. The adjustment to the $Z_{DR}$ field allow slowly-varying $Z_{DR}$ offsets to be applied to the system. A quality control procedure is then performed, which will be discussed in further detail below. Finally, for the polarimetric data, a specific differential phase ("$K_{dp}$") is computed using a finite impulse response filter technique, which can be weighted by a reflectivity value.

In step 36, the system performs a quality control check on the processed radar data. Specifically, a quality control ("QC") algorithm is applied to the radar data. First, Doppler velocities can be optionally de-aliased, such as when a phase shift from a radar target cannot be resolved. For example, the system can use a native Py-ART function that uses a dynamic network reduction technique to find regions of similar velocities and merge pairs of regions until unfolding is complete. Next, the system can use a MetSignal algorithm to remove non-meteorological return from the radar data. The MetSignal algorithm is a weighted fuzzy logic approach that outputs a single meteorological signal class and requires only radar data (other QC algorithms can require additional data, such as environmental temperature data). The MetSignal algorithm is intended to operate on polarimetric data, but is also able to operate on single polarization radar data as well. Input variables can include horizontal reflectivity ("$Z_h$"), $\Phi_{DP}$, Doppler velocity ("V"), cross-correlation coefficient ("$\rho_{hv}$"), and others. The system then computes a standard deviation for the $\Phi_{DP}$, $Z_{DR}$, and $\rho_{hv}$ fields, which is used as a "texture" field to aid in identification of a non-meteorological echo.

Figure 3:
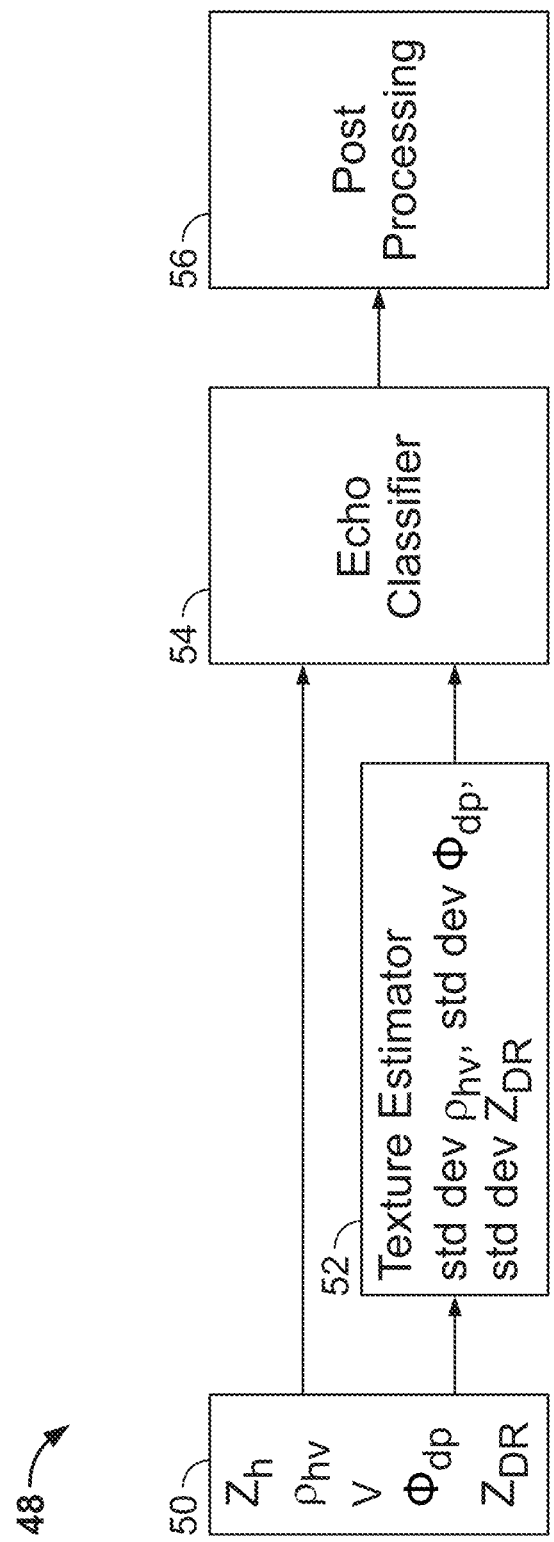
FIG. 3 is a diagram illustrating a workflow of the MetSignal algorithm of the present disclosure.

FIG. 3 is a diagram illustrating a workflow of the MetSignal algorithm, indicated generally at 48. Input variables 50 are fed into a texture estimator 52 and/or an echo classifier 54. The input variables can include terms $Z_h$, $\Phi_{DP}$, V, $\rho_{hv}$, and $Z_{DR}$. The texture estimator can determine a standard deviation for the input variables 50. The output from the echo classifier 54 is post processed 56 by the system.

Figure 4:
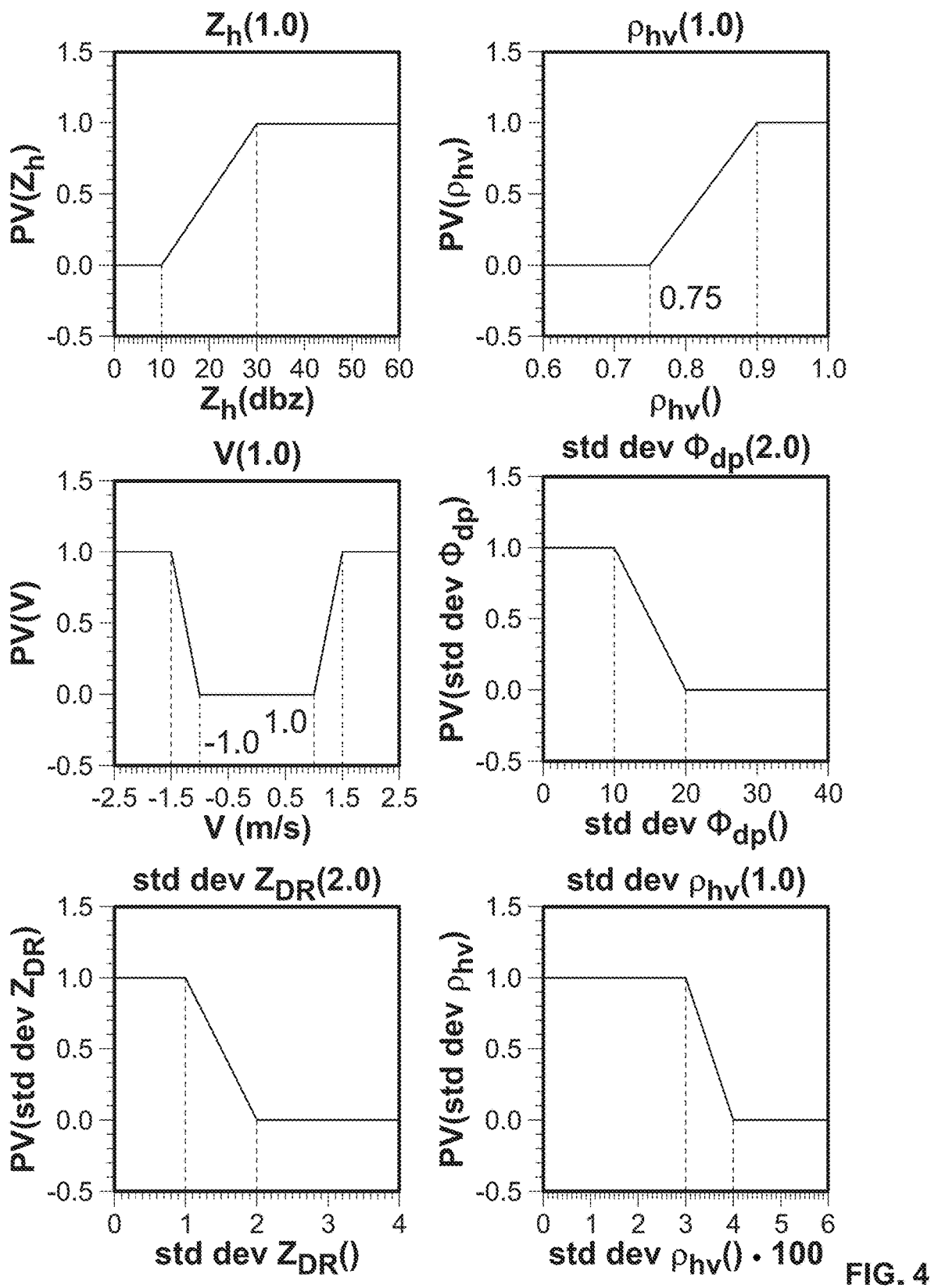
FIG. 4 is a set of graphs showing single-sized and double-sided trapezoid membership functions used by the MetSignal algorithm.

FIG. 4 is a set of graphs showing single-sized and double-sided trapezoid membership functions used by the MetSignal algorithm. The system determines an aggregation score at each radar bin (gate) in the cloud storage system using Equation 1, below:

$$A = \frac{\sum_{j=1}^{6} W_j PV_j}{\sum_{j=1}^{6} W_j}$$

Equation 1

The term PV is a membership function which uses the single-sided or the double-sided trapezoid shape, and term W is a weighting determined by Table 1, shown below. Specifically, Table 1 shows six variables and weights assigned to each in the MetSignal Algorithm. Table 1 was composed based upon extensive research and experience in hands-on identification of weather radar data contamination.

TABLE 1

| Variable | Weight |
|---|---|
| Horizontal reflectivity $Z_h$ | 1.0 |
| Cross-correlation coefficient $\rho_{hv}$ | 1.0 |
| Velocity V | 1.0 |
| Variability of differential phase [std dev($\Phi_{DP}$)] | 2.0 |
| Variability of differential reflectivity [std dev($Z_{DR}$)] | 2.0 |
| Variability of cross-correlation coefficient [std dev($\rho_{hv}$)] | 1.0 |

It is noted that the term A, which can range from 0-1, is integrated over the number variables input, thus allowing single polarization data to be used. However, results can be improved with the addition of dual polarization data. Following the computation of term A, a lower threshold, such as 0.8, can be used for warm seasons (and 0.7 for cold seasons) to retain the bins as a meteorological signal. Additional filters are performed to remove any remaining non-meteorological echo. Any bin with a $\rho_{hv}$ value of less than 0.65 can be automatically removed by the system. Additionally, a bin with a value of term $|Z_{dr}|$ being greater than 4.5 decibels ("dB") can be used by the system to assist in the removal of migrating birds and wind turbines.

The present system is designed for real-time operational deployment within a radar product generator ("RPG") framework. Generally, because the MetSignal algorithm acts upon a base elevation scan in operations, not all points at a 3 km height are available for a volume in real-time. For this reason, a previous volume scan is operationally used for this determination. However, the present system can take advantage of a full volume scan. Therefore, no 3 km constant altitude plan position indicator ("CAPPI") from a previous volume is computed and, instead, a layer ±500 meters about the 3 km height level can be used to search values greater than 11 dBZ (decibels relative to a reflectivity factor ("Z")). If found, these are all considered meteorological and reinstated if masked by a previous step.

In the case of dual polarization data, the Metsignal algorithm can be extended to include a "defuzzification" step. Specifically, a center of mass value is determined by the system, which is a weighted average across an output domain with knowledge of output membership functions.

Returning to step 36, the system can further apply a melting layer detection algorithm ("MLDA") to develop a mask for bins contaminated by a melting layer ("ML"). The ML is a vertical depth where frozen hydrometeors are melting and, due to differing values of the dielectric constant for liquid water and ice, appear as enhancements of $Z_h$ and $Z_{DR}$ signals and minimum of coefficient $\rho_{hv}$, though not necessarily vertically aligned. This can occur near an atmospheric level of 0° C. Because melting is not an instantaneous process due to microphysical and kinematic processes, melting occurs over a layer typically 500-700 meters thick.

The MLDA algorithm uses along-ray smoothed $Z_h$, $Z_{DR}$, and $\rho_{hv}$ to identify bins to analyze radial profiles. The system can apply adjustable thresholds for the elevation angle, $Z_h$, and $\rho_{hv}$ that occur lower than, for example, 6 km to determine possible ML points. The system then determines a maxima in the $Z_h$ and $\rho_{hv}$ profiles for an adjustable range of values for each variable. If this occurs within approximately 500 meters of the possible ML points, then these are considered to be ML points. A minimum number (e.g., 100) of ML points can be identified to return the identified ML points as valid. Otherwise, the system can conclude that no ML was found.

In step 38 of FIG. 2, the system checks for split cuts. Split cut scanning separately optimizes amplitude and phase moments (e.g. reflectivity and Doppler velocity, respectively) on back-to-back repeated elevation sweeps. This is achieved by use of an alternating pulse repetition frequency. A configuration list of the VCPs is used to determine whether processing is completed. A velocity sweep can be dropped. Alternatively, the system can combine data from the alternating two sweeps into one by choosing using a smaller number of range gates and selectively saving appropriate field information from both sweeps.

In step 40, the system computes a rain rate. For example, optional rainfall rate estimations can be derived using Colorado State University's blended algorithm that identifies ice fraction using difference reflectivity to select an appropriate relationship to employ for computation. The blended algorithm uses terms $Z_h$, $Z_{DR}$, and $K_{dp}$ and applies conditional filters of threshold values of each term based upon radar frequency to identify the one of many power law calculations of rainfall rate.

Figure 5:
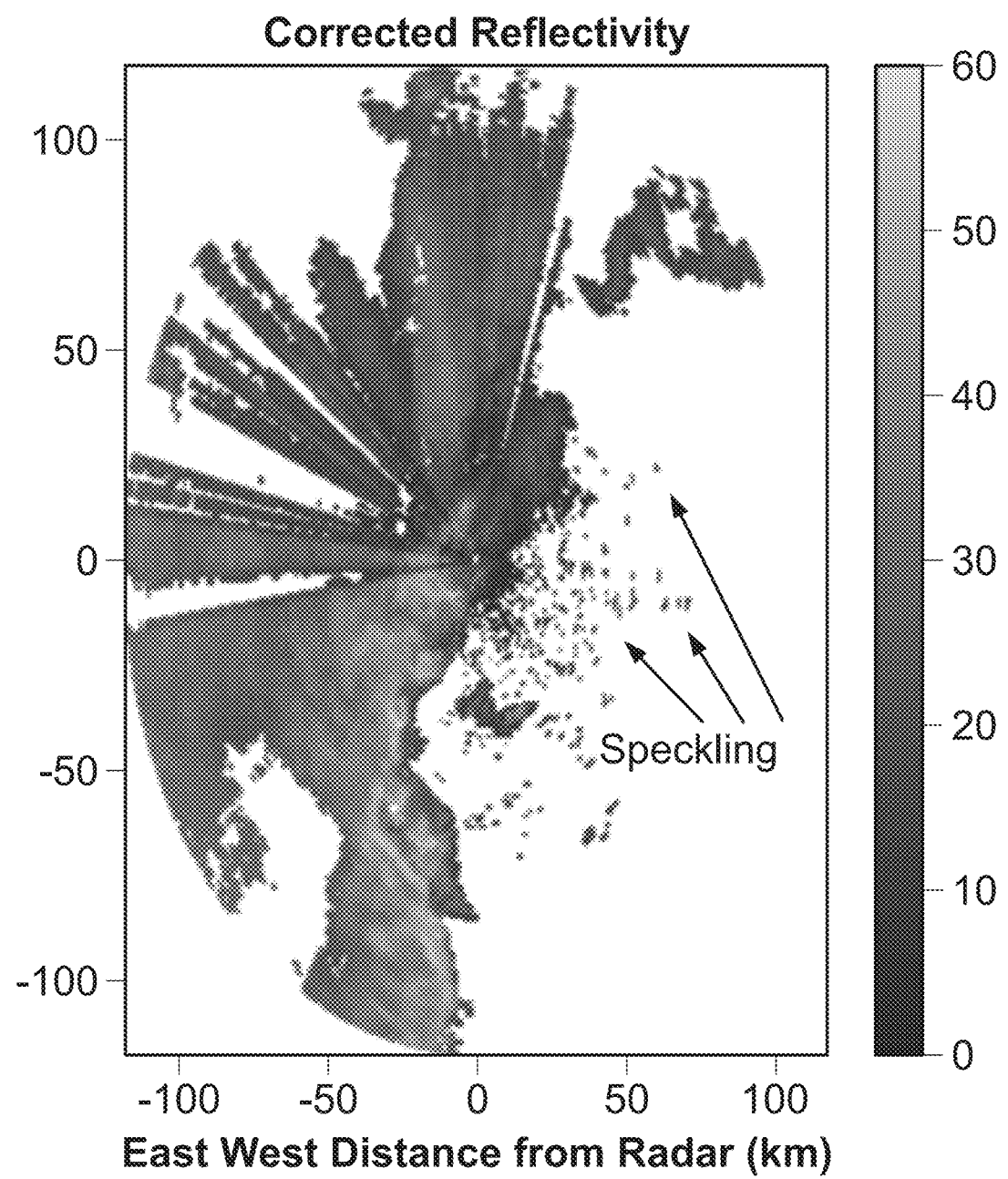
FIG. 5 is a graph showing an example of speckling of radar data.

In step 42, the system post-processes the radar data. For example, during the course of processing the radar data, speckling can occur where an individual point or groups of points remains with no surrounding values in the adjacent neighborhood. FIG. 5 is a graph showing an example of speckling of radar data. The system can use a de-speckling algorithm to perform a de-speckling procedure to remove/reduce the speckling. The de-speckling algorithm identifies a number of objects identified using properties in the configuration, such as contiguous gates, and removes them. The system can compute a value of longitude, latitude and altitude ("MSL") of each gate center using the azimuthal equidistant projection.

In step 44, the system generates an output file(s). For example, output data can be generated into a CF-compliant NetCDF file format and saved to a storage system, such as the cloud storage system. If a data file is not processed, the system can generate an empty NetCDF file with a single flag to ensure proper processing of data in later processes. In addition to the processes discussed above, the system can further configure a file (e.g., enable/disable pieces, define parameters, set expected movements/weather products, etc.) and perform message logging (e.g., uniform with other components of the system, record expected and unexpected failures, record metrics for health of the system, generate informational output, etc.)

Figure 6:
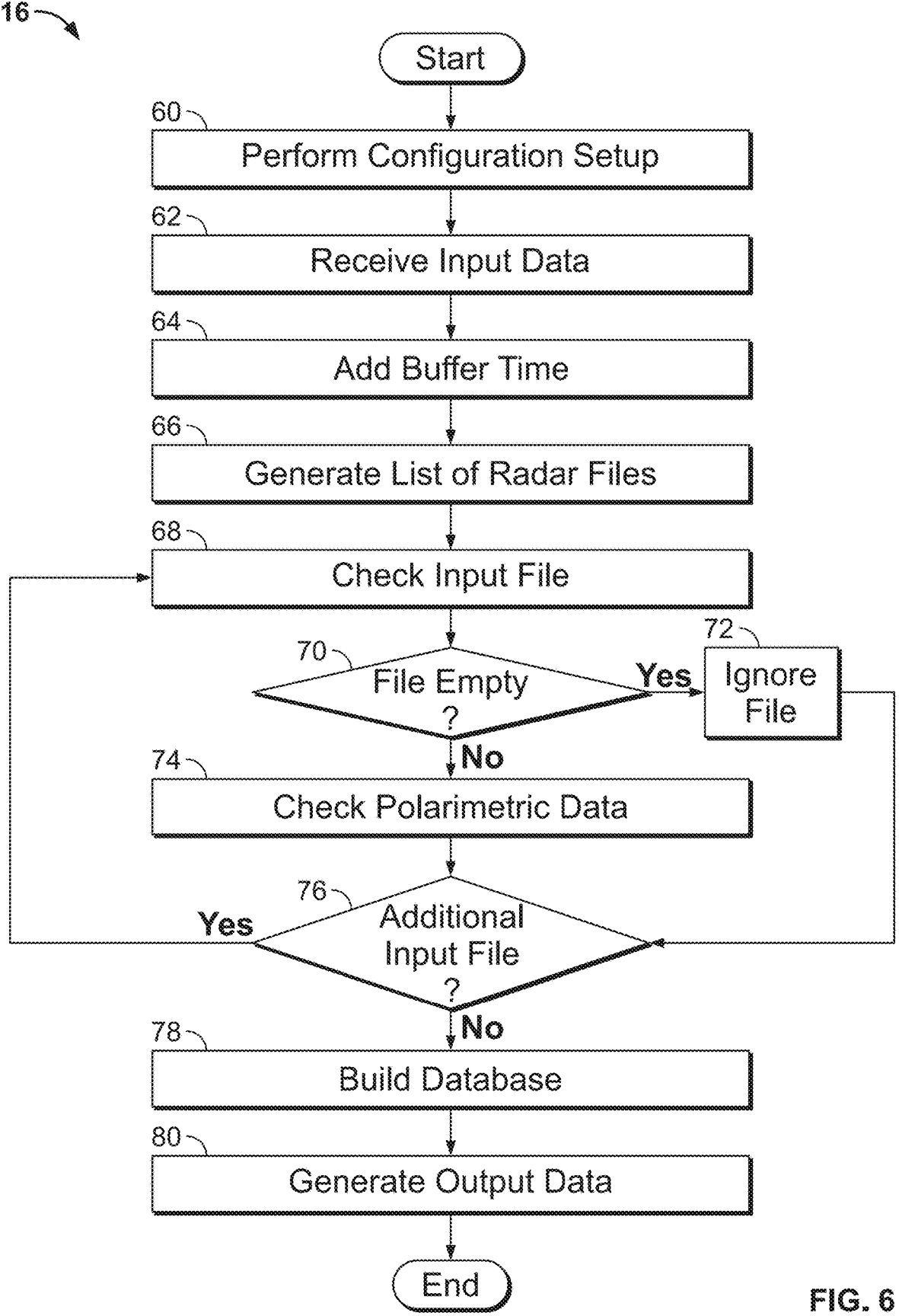
FIG. 6 is a flowchart illustrating step 16 of FIG. 1 in greater detail.

FIG. 6 is a flowchart illustrating step 16 of FIG. 1 in greater detail. In step 60, the system performs a configuration step. Specifically, the system can configure a time duration of a component (e.g., 1 hour), a processing cadence (e.g., 5 minutes), environmental data, and computing parameters. For example, the system defines a region consisting of a number of radar as grouped together for processing using a configuration file. The regions can be chosen to be in close proximity to each other, though the system can process any number or selection of radars. In step 62, the system receives input data, such as the radar data. Specifically, the system can receive the data files from a previous step (e.g., NetCDF files), NWP model data files (e.g., the RAP, the HRRR, etc.), region data (e.g., a region including approximately three radars and a defined configuration), etc.

In step 64, the system adds a buffer time. Specifically, the system defines a block of time (for example, one hour) for starting and stopping processing, with steps of time periods (for example, 5 minutes) and any associated buffer chunks. In step 66, the system generates a list of radar files. For example, using the block of time/time periods, the system generates a list of appropriate NetCDF file names from the radar data.

In step 68, the system checks an input file from the list. In step 70, the system determines whether the input file is empty. If the input file is empty, the system proceeds to step 72, where the system ignores the file, and then proceeds to step 76. If the input file is not empty, the system proceeds to step 74, where the system checks that polarimetric data (such as dual polarization data) is present in the input file. This modifies how the system handles the data processing in terms of the data elements to be stored.

In step 76, the system determines whether there are additional input files in the list. If there are additional files, the system proceeds to step 68. If there are no additional files, the system proceeds to step 78, where the system builds a database. Specifically, the system instantiates a database, such as a Badger database, to retain all concatenated radar data in, for example, a point cloud format. The system can also retain environmental information for each point, which the system can interpolate to each point that is processed. This data can be gathered from an NWP data file that is chosen at a start time. The system can retain each valid data point.

In step 80, the system generates output data. For example, the system can generate a Badger database tarred archive of files, which can be stored on the cloud storage system (for example, for each 5-minute step within a 1-hour processing window).

Figure 7:
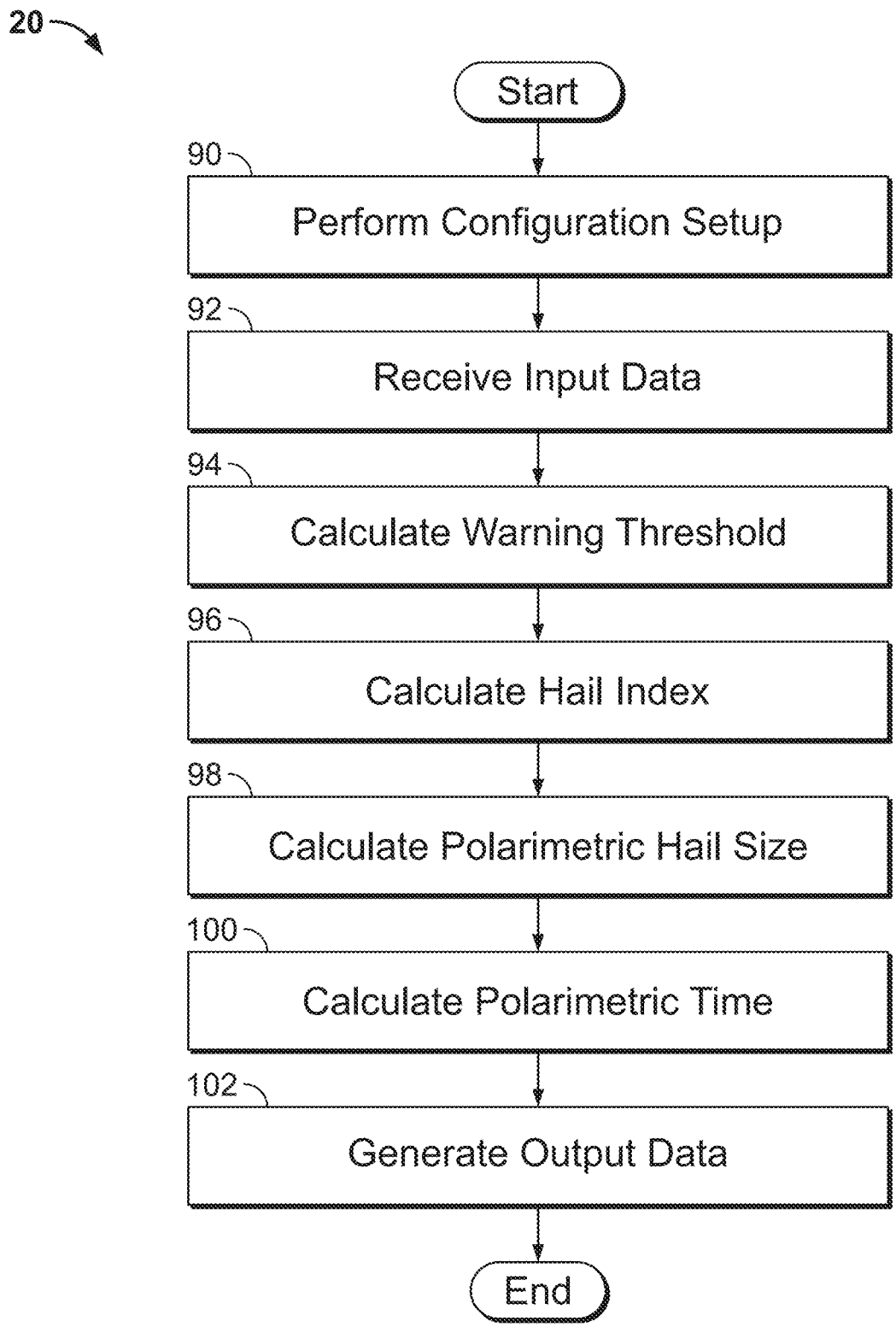
FIG. 7 is a flowchart illustrating step 20 of FIG. 1 in greater detail.

FIG. 7 is a flowchart illustrating step 20 of FIG. 1 in greater detail. In step 90, the system performs a configuration setup. Specifically, the system can include defining the configuration by a weather product plugin, a processing cadence (e.g., 5 minutes) from a previous step, and by region data defined by a previous step. The computation of weather products can occur over multiple software components. In step 92, the system receives input data. Specifically, the system receives the output data generated in step 80 of FIG. 6, such as the database files. The database files act to define the input data as well as the time and spatial span of initial computations. Each individual data point in the database files is computed against appropriate variables (such as a radar reflectivity variable), are output as database tarred archive files and saved to temporary cloud storage buckets. These files can be retained for a short time to limit the storage necessary for intermediate steps.

In step 94, the system calculates a warning threshold ("WT") to determine when severe hail may be observed. The system can use non-polarimetric calculations. It is noted that the warning threshold is correlated to a height of the melting level ($H_{0C}$) and can be computed using Equation 2, below, where a minimum $H_{0C}$ value of 20 is used:

$$WT = 57.5 H_{0C} - 121 \qquad \text{Equation 2}$$

In step 96, the system calculates a severe hail index ("SHI"). Specifically, the system calculates the SHI, using Equation 3 below, as the summation of a height weighted ("$W_T$") hail kinetic energy ("HKE"), which the system calculates using Equation 4, below:

$$SHI = 0.1 \int_{H_0}^{H_T} W_T(H) HKE \, dH \qquad \text{Equation 3}$$

$$HKE = 5 \times 10^{-6} \times 10^{0.84 Z} W(Z) \qquad \text{Equation 4}$$

The term $H_T$ is a top of a storm cell. Terms $W(Z)$ and $W_T(H)$ are defined by Equations 5 and 6, respectively, below:

$$W(Z) = \begin{cases} 0 & \text{for } Z \le Z_L \\ \dfrac{Z - Z_L}{Z_O - Z_L} & \text{for } Z_L < Z < Z_O \\ 1 & \text{for } Z \ge Z_O. \end{cases} \qquad \text{Equation 5}$$

$$W_T(H) = \begin{cases} 0 & \text{for } H \le H_O \\ \dfrac{H - H_O}{H_{m2o} - H_O} & \text{for } H_O < H < H_{m2o} \\ 1 & \text{for } H \ge H_{m2o}. \end{cases} \qquad \text{Equation 6}$$

Due to the unstructured nature of the data, the integrand of the SHI [$W_T(H)$*HKE] is computed at this step, which will be referred to as the specific hail index to differentiate from the full SHI.

In step 98, the system calculates polarimetric hail size. The system can use a polarimetric hail size algorithm, which will be explained in greater detail below. In step 100, the system calculates a polarimetric time. Specifically, the system determines a time of occurrence for two distinct polarimetric hail sizes. The system generates separate masks for the presence of different sized hail. For example, the system can generate a first mask for hail size greater than 12.7 mm (0.5 inch) and a second mask for hail size greater than 25.4 mm (1.0 inch) to aid in calculating hail durations. These common hail sizes are of interest to determine hail duration in further steps below, but it should be noted that any hail size could be chosen here. It is noted that the cumulative impact of these size hailstones may be correlated to property damage.

In step 102, the system generates output data. The output data includes unstructured data output generated by the method of step 20 for spatial aggregation across CONUS. The output data can be stored in a bucket of the cloud storage. It is noted that any spatial sub-region (or expansion) could be definable via configuration.

Figure 8:
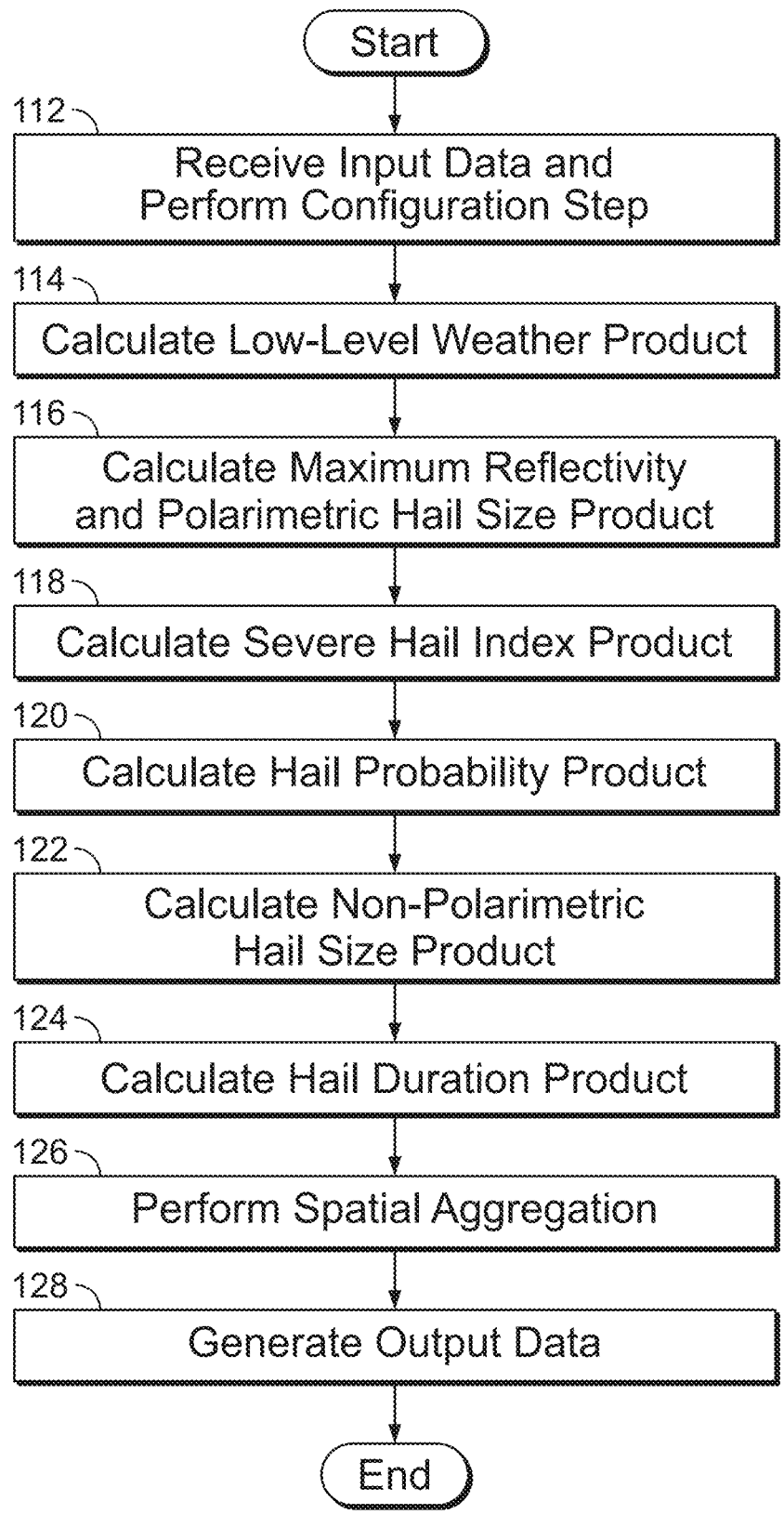
FIG. 8 is a flowchart illustrating step 22 of FIG. 1 in greater detail.

FIG. 8 is a flowchart illustrating step 22 of FIG. 1 in greater detail. In step 112, the system receives input data and performs a configuration step. The input data can include the unstructured data output generated by the method of step 20, database files, etc. For each weather product, the system generates a Cartesian grid with a resolution size (for example, an approximately 1 km resolution). The system aggregates and interpolates all regions found from the initial weather product computation onto the Cartesian grid with varying methodologies based upon the desired weather product. This will be discussed in further detail below. The methodologies can consider every individual point location. The system transforms a 3D spatial index (coordinate) to a one dimensional hashing index, which can include multiple points. To retrieve neighbors from a location, the system returns all possible hash indexes from the closest hash index. Because there could be multiple points returned, the system derives the neighbors by screening the return points to within a specified distance. The system then derives a value for the grid point location of interest by collecting neighboring values within a predefined (e.g. 1 km) radius centered on that point of interest. The neighboring values are passed into a B-spline smoothing kernel to provide a representative interpolated value.

In step 114, the system calculates a low-level weather product. The low-level weather product begins at the lowest possible altitude and continues upward vertically until a point is found to allow the collection of neighboring values for point interpolation. The system uses a log estimator to perform a proper weighting of decibel values. If no value is found, then a missing data value is recorded. The maximum altitude is configurable (e.g. 10 km) to allow for a restriction of the vertical search parameter.

In step 116, the system calculates a maximum reflectivity and a polarimetric hail size product. The maximum reflectivity and a polarimetric hail size product begin at the lowest possible altitude and continues upward vertically until a point is found and the value is stored. The system uses a log estimator to perform a proper weighting of decibel values, while the system uses a linear estimator for non-decibel data. If no value is found, then a missing data value is recorded. If a valid value is found, the search continues upward and if a value greater than the stored value is found, it overrides the stored value. Taking the maximum value may lead to bulk overestimation of hail size if the melting does not correspond to the theoretical model that was used to develop the polarimetric hail size relationships. The system can converge on a solution that validates most closely to ground truth using an algorithm.

In step 118 calculates a SHI (severe hail index) product. The SHI product begins at the lowest possible altitude and continues upward vertically, summing the specific hail index using the equation noted above. The system uses a linear estimator on the data points. It is noted that from the above computation of SHI, that any points found below the height of the 0° C. level will have a value of zero due to the weighting factor. If the search reaches a predetermined height level (for example, a −20° C. height level) without finding any data, the system then assumes that no hail production will be observed at the ground. This could be the case, for example, if an elevated convective storm occurs, but has not begun to precipitate. In this case, SHI remains zero and the next grid point is processed by the system.

In step 120, the system calculates a hail probability ("POSH") product. The POSH product begins at the lowest possible altitude and continues upward vertically, using the same computation of SHI. In addition, the WT (warning threshold) also applies the same screening. For each point, the system uses Equation 7, below, at every data grid point.

$$POSH = 29\ \ln\left(\frac{SHI}{WT}\right) + 50, \qquad \text{Equation 7}$$

In step 122, the system calculates a non-polarimetric hail size product. The non-polarimetric hail size product (MESH) is calculated by the system using Equation 8, below, and is calculated at every data grid point.

$$MESH = 2.54\, SHI^{0.5} \qquad \text{Equation 8}$$

In step 124, the system calculates a polarimetric hail duration product. The polarimetric hail duration product begins at the lowest possible altitude and continues upward vertically until a point is found to allow the collection of neighboring values for point interpolation. The system uses a time duration estimator on the data points that searches for the minimum and maximum times found for the neighboring points and computes the difference for a time duration value for each grid point by continually finding the earliest and latest times and updating the difference between them. If no value is found, then a missing data value is recorded. The maximum altitude is configurable (e.g. 10 km) to allow for a restriction of the vertical search parameter In step 126, the system performs spatial aggregation. By way of example, the output of the spatial aggregation is a gridded NetCDF file that contains five minutes of data. The five-minute data is also used to generate a final non-polarimetric hail duration product. This occurs in a time aggregation step that is configurable for any time duration, defaulting to 1-hour product aggregation. All files within the time window are found for processing. The polarimetric and non-polarimetric hail sizes, hail index, hail probability, and low-level and maximum radar reflectivity products find a maximum during the time period at each grid point. The system sums together the polarimetric hail duration times (for both 0.5 and 1.0 inch) at each grid point.

The non-polarimetric hail duration uses the non-polarimetric hail size to distinguish 0.5 inch and 1.0 inch hail in each file. The system multiplies incremental counters for each distinguishing hail size by the time duration of those points and sums over all files for each grid point to produce two separate output files for each hail size noted above. A second implementation of hail duration (both polarimetric and non-polarimetric) can also be generated. In this method, the processing time step is used as an upper bound (e.g. 5-min as discussed above), with the lower limit being defined by processing resolution. Therefore, the duration is a time range, but is equivalent to a maximum estimated duration time for hail of the defined sizes. For missing data, a value of zero is assumed so that the missing values do not contribute to the output (e.g., a gridded NetCDF file).

In step 128, the system generates output data. For example, the system can aggregate the hourly files into multi-hour products (i.e. 6 hours) and daily products. Both NetCDF and shapefiles, as well as other raster-based and vector-based file formats, can be generated. The files are then made available to customers and can being sent to multiple delivery end points (e.g., SFTP, API, etc.).

Figure 9:
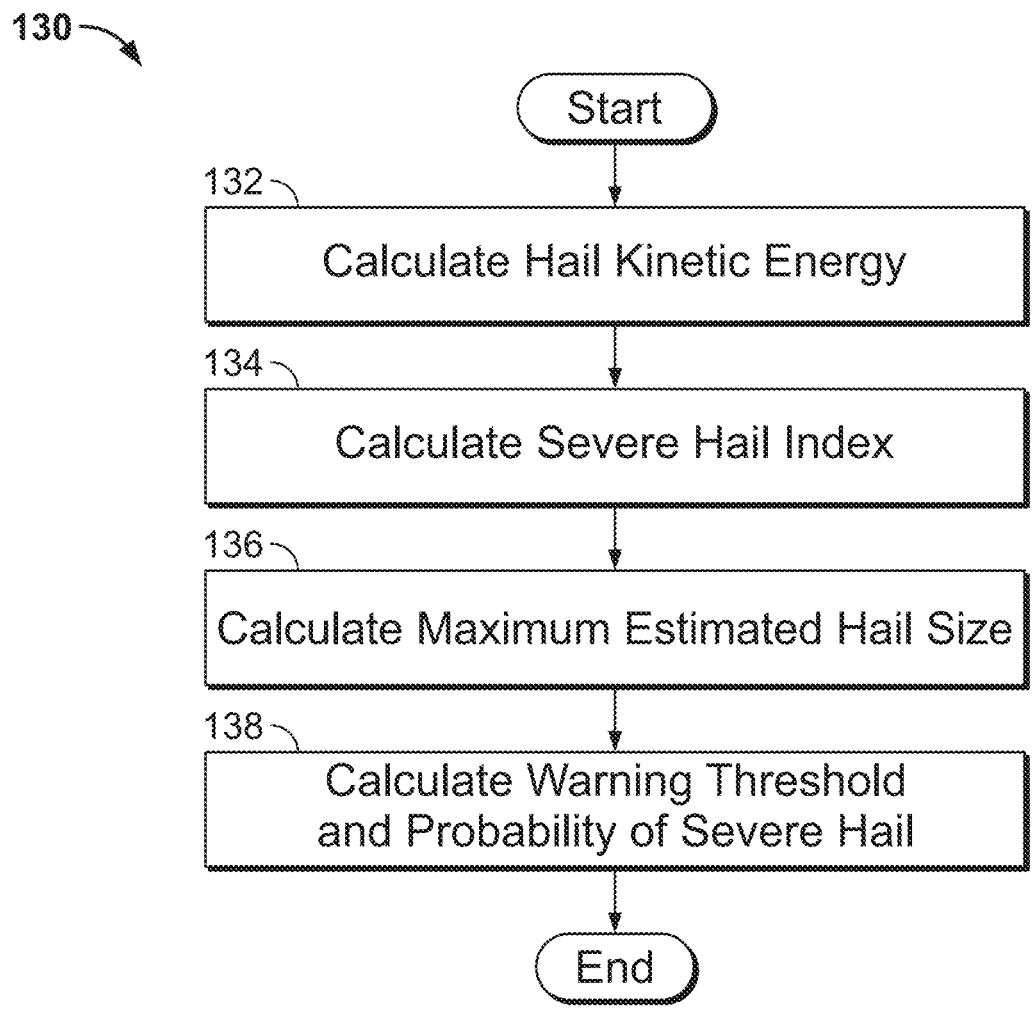
FIG. 9 is a flowchart illustrating process steps carried out by the non-polarimetric size hail detection algorithm of the present disclosure.

FIG. 9 is a flowchart illustrating process steps of the non-polarimetric size hail detection algorithm ("HDA"), indicated generally at 130. The HDA determines an estimated hail size, as well as an index and probability of severe hail based upon radar reflectivity (Z) values as well as key environmental thermodynamic information.

In step 132, the system calculates hail kinetic energy. Hail kinetic energy is empirically related to a weighted Z, with adjustable lower and upper thresholds of Z chosen by the known values corresponding to hail. This in turn is weighted by the system depending on an associated temperature, a method of representing hail growth as a function of temperature.

In step 134, the system calculates a severe hail index. The severe hail index is calculated as a vertical integral of kinetic energy associated with a storm above the freezing level of water. Integrating over the height layer above the freezing level to the storm top yields the hail index.

In step 136, the system calculate a maximum estimated hail size using the hail index. For example, a $75^{th}$ percentile model fit (of observational comparisons) can be used to determine an appropriate fit function.

In step 138, the system calculates a warning threshold and a probability of severe hail. Specifically, the system calculates the warning threshold based upon a height of a point of interest. The system then calculates the probability of severe hail proportionally to a ratio of the hail index to the warning threshold. An output from the HDA can be used in the polarimetric hail size algorithm. In addition, if polarimetric data are missing, the system can revert to the HDA for product distribution. In this way, the system is able to produce final output solutions for hail size by intelligently combining the non-polarimetric hail size algorithm with the output from the polarimetric hail algorithm in locations where polarimetric data are not available.

Figure 10:
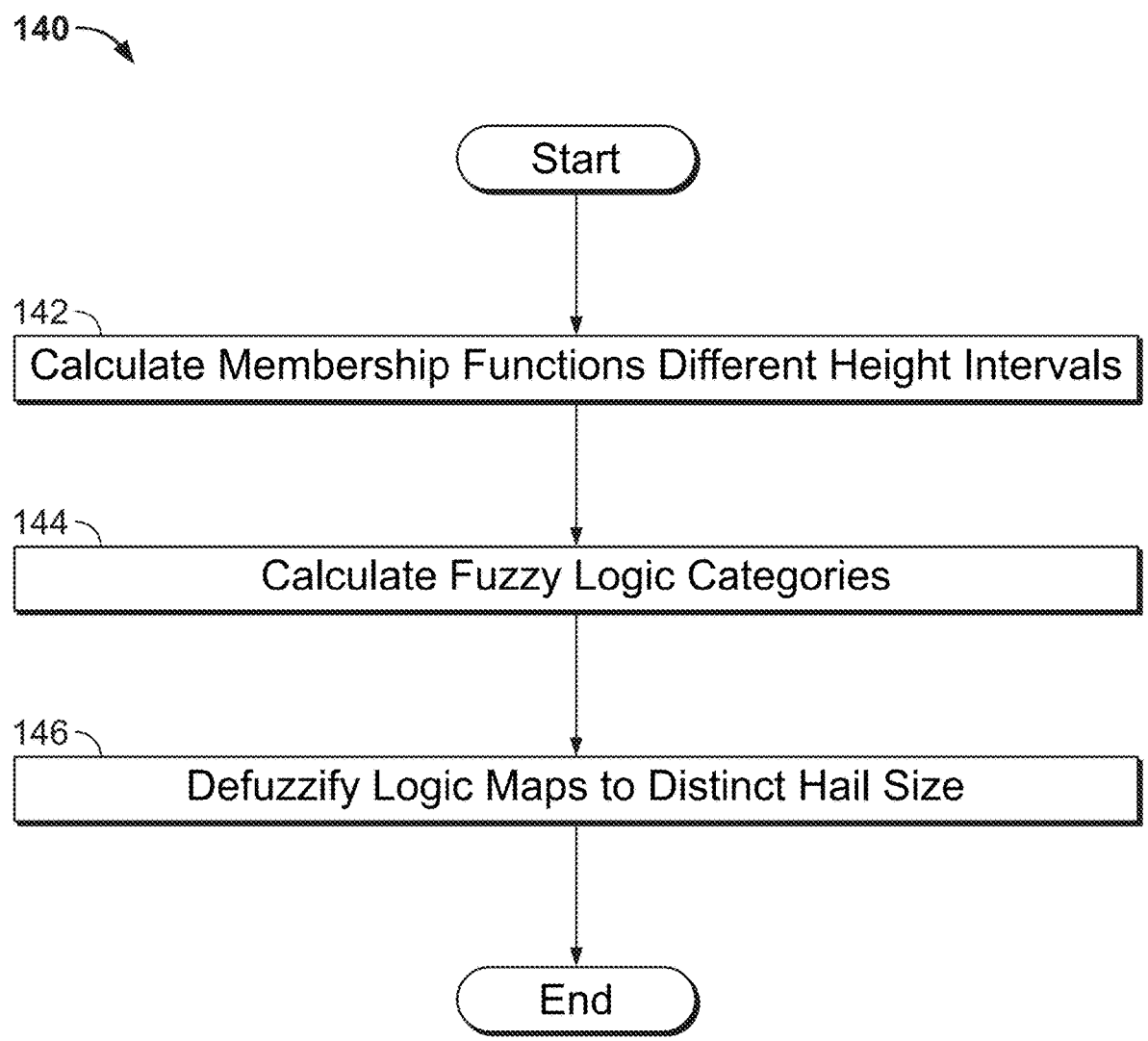
FIG. 10 is a flowchart illustrating process steps carried out by the polarimetric hail size algorithm of the present disclosure.

FIG. 10 is a flowchart illustrating process steps of the polarimetric hail size algorithm, indicated generally at 140. The polarimetric hail size algorithm can differentiate between different size hail. Radar reflectivity ($Z_h$), differential reflectivity ($Z_{dr}$), and cross-correlation coefficient ($\rho_{hv}$) are terms used by the system. The polarimetric hail size algorithm can use a hydrometeor classification algorithm during calculations.

In step 142, the system calculates membership function at different height intervals. By way of example, six height intervals were used. Specifically, the system uses trapezoidal membership functions to generate an aggregated value using Equation 9, below:

$$A_i = \frac{\sum_{j=1}^{3} W_j Q_j P^j(V_j)}{\sum_{j=1}^{3} W_j Q_j}, \quad \text{Equation 9}$$

Terms Q and W are weights, and term P(V) is a membership function. In a case where the calculated aggregate value(s) are less than a predetermined value (e.g., 0.2), the calculated aggregate value is set to zero. The membership functions are dependent upon height with respect to the wet-bulb temperature melting level. The membership functions are shown in Equation Set 1, below, and act as thresholding structures that aggregate into a value output.

$$f_1 = -0.5 + 2.5 \times 10^{-3} \times Z_h + 7.5 \times 10^{-4} \times Z_h^2 + \Delta Z_{DR}, \quad \text{Equation Set 1}$$
$$f_2 = 0.1 \times (Z_h - 50.0) \times \Delta Z_{DR},$$
$$f_3 = 0.1 \times (Z_h - 60.0) + \Delta Z_{DR},$$
$$g_1 = -0.9 + 1.5 \times 10^{-2} \times Z_h + 5.0 \times 10^{-4} \times Z_h^2 + \Delta Z_{DR},$$
$$g_2 = 0.075 \times (Z_h - 50.0) + \Delta Z_{DR}, \text{ and}$$
$$g_3 = 0.075 \times (Z_h - 60.0) \times \Delta Z_{DR}.$$

Table 2, below indicates the weights used for the polarimetric variables at the various height layers. The relative importance of each input variable to one another varies with the height.

TABLE 2

| Height layer | $Z_h$ | $Z_{DR}$ | $\rho_{hv}$ |
|---|---|---|---|
| $H_b \geq H(T_w = -25° C.)$ | 1.0 | 0.3 | 0.6 |
| $H(T_w = -25° C.) < H_b \leq H(T_w = 0° C.)$ | 1.0 | 0.3 | 0.6 |
| $H(T_w = 0° C.) < H_b \leq H(T_w = 0° C.) - 1$ km | 0.8 | 0.5 | 0.6 |
| $H(T_w = 0° C.) - 1$ km $< H_b \leq H(T_w = 0° C.) - 2$ km | 0.7 | 0.8 | 0.6 |
| $H(T_w = 0 ° C.) - 2$ km $< H_b \leq H(T_w = 0° C.) - 3$ km | 0.7 | 1.0 | 0.6 |
| $H_b < H(T_w = 0° C.) - 3$ km | 0.7 | 1.0 | 0.6 |

Dependence on height requires data from the vertical atmospheric thermodynamic environment. The system can use NWP (Numerical weather prediction) models (e.g., the RAP model) to determine this data. The system uses logic on model run hour and forecast hour to choose an appropriate profile that most closely aligns with the time of analysis. In the event that these data are missing, the system can use a standard atmosphere approximation model for computations.

In step 144, the system calculates fuzzy logic categories. Specifically, the system outputs score results of the membership functions into one or more categories. For example, the system can use three fuzzy logic categories: a small category of hail measuring 0-2.5 cm in size, a large category of hail measuring 2.5-5 cm in size, a giant category of hail measuring >5 cm in size.

In step 146, the system de-fuzzifies logic maps to distinct hail sizes. Specifically, to retrieve an estimate of hail size, the system translates the categorical results from a membership value space to a quantitative size value. More specifically, the system generates trapezoidal membership functions that scale the minimum and maximum categorical sizes by an input fuzzy value. The system then uses a center of mass computation to determine the distinct hail size value.

Figure 11:
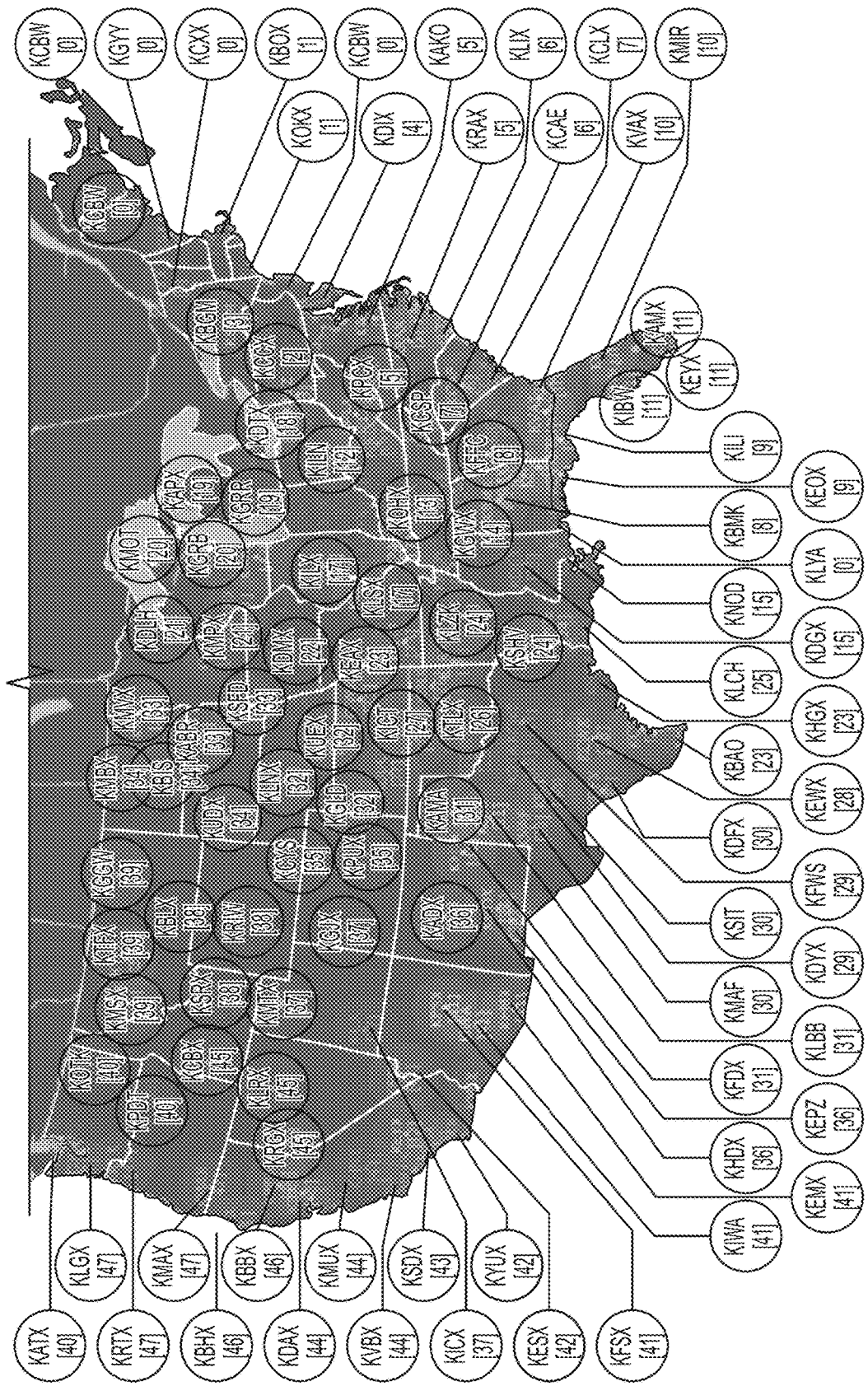
FIG. 11 is an illustration showing NEXRAD locations and region IDs of radar systems across the continental USA.

By way of example, a maximum possible hail size of 105 mm is applied. This size roughly corresponds to the maximum detectable hail size for S-band (NEXRAD radars). Above this, resonance at S-band frequency can compromise the ability of distinctly determining a target size from a weather radar system. FIG. 11 is an illustration showing NEXRAD locations and Region IDs across the CONUS (continental USA). It is noted that the maximum hail threshold can be applied retroactively to the HDA computation.

Figure 12B:
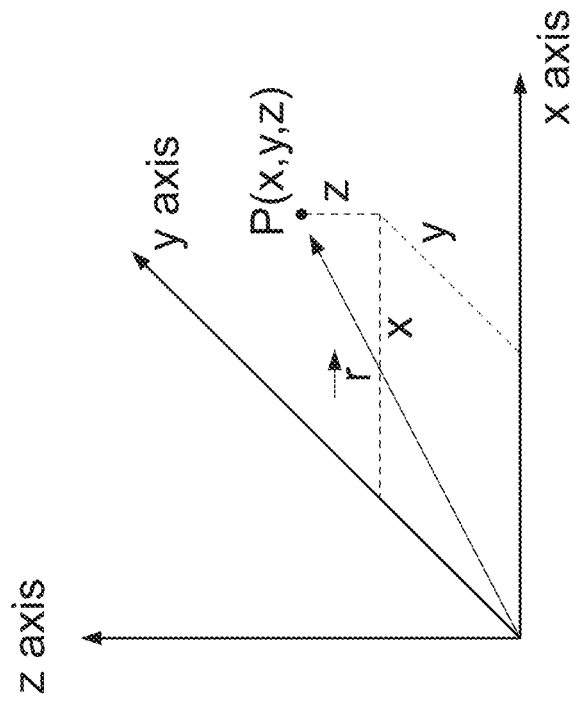
FIGS. 12A-12B are graphs illustrating converting polar coordinates of weather radar data into a Cartesian grid.
Figure 12A:
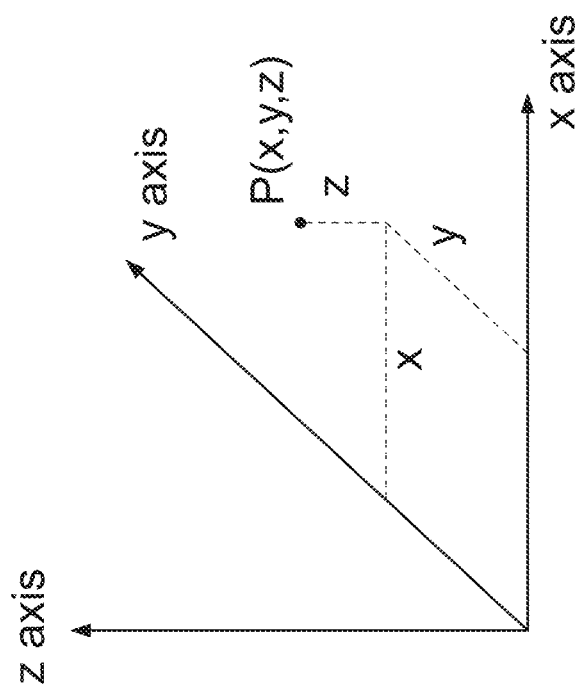
Figure 13:
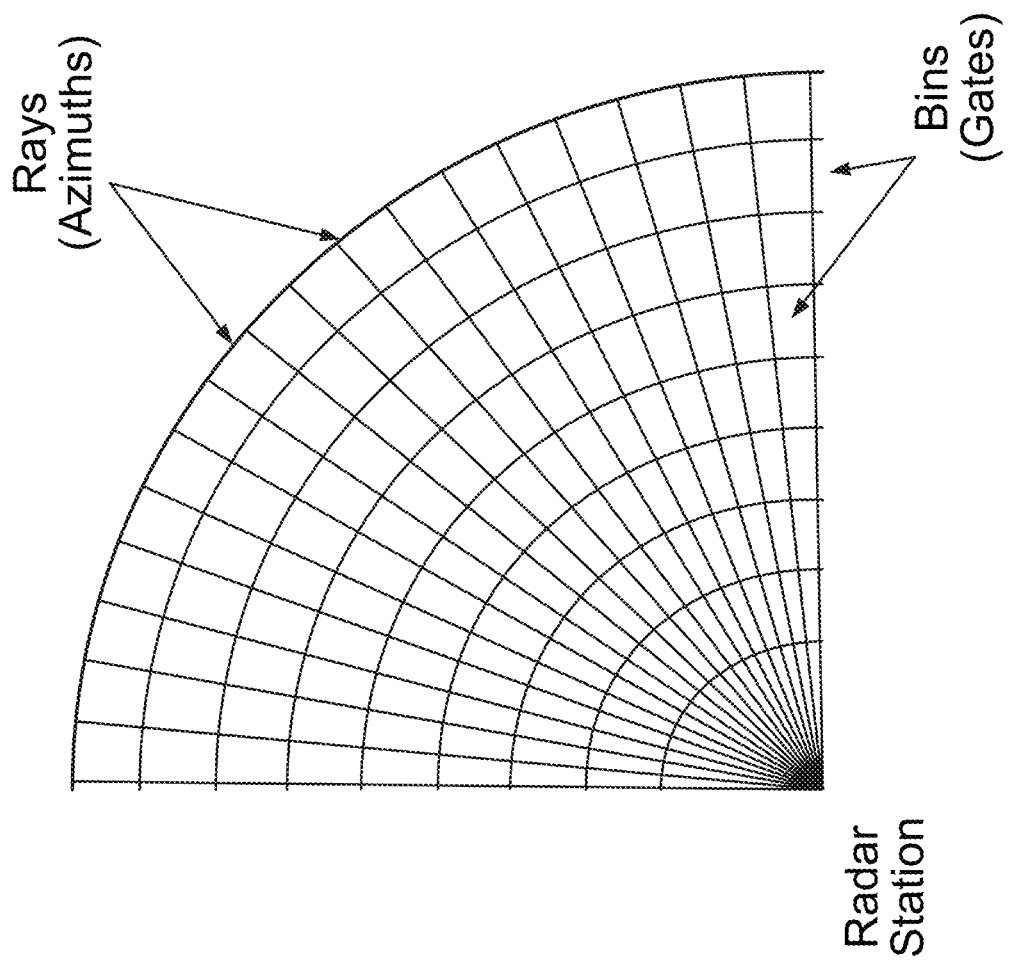
FIG. 13 is an illustration showing rays generated by a radar station, and bins within the generated rays.

WRPSs (Weather Radar Processing Systems) generally choose to convert native polar coordinates (azimuth-range) of weather radar data into a Cartesian grid (x-y-z or longitude-latitude-altitude), as shown by the graphs illustrated in FIGS. 12A-12B. This can greatly simplify some computations due to normal spacing and a decimation of the number of data points. However, this also negates finer resolution that is achievable from the native radar coordinates, specifically nearer to the radar location, as shown by the illustration in FIG. 13.

Given the positioning of weather radar systems near to population centers, treating the radar observations in their native coordinates may afford more accurate products due to the greater density of measurements where a greater number of property damage claims may occur.

A byproduct of processing the data in this way requires a methodology that deviates from the typical WRPS when computing the non-polarimetric HDA. In this case, the system can impose a grid upon the data at a much later step. This means that that some calculations are now spread across processing steps. Instead of implementing a monolithic computation step, a more distributed computation strategy is used to decrease compute time and retain greater data resolution for as long as possible.

This distribution results in non-polarimetric hail products of typical 5-minute resolution, when creating output data aggregated across the CONUS. However, because the present system is able to perform computations on the native radar coordinate data, hail size and duration data can be computed at sub 1-minute resolution if desired. As such, the present system can keep data in a point cloud rather than gridded format through the stitching of data into a CONUS-wide product.

Figure 14A:
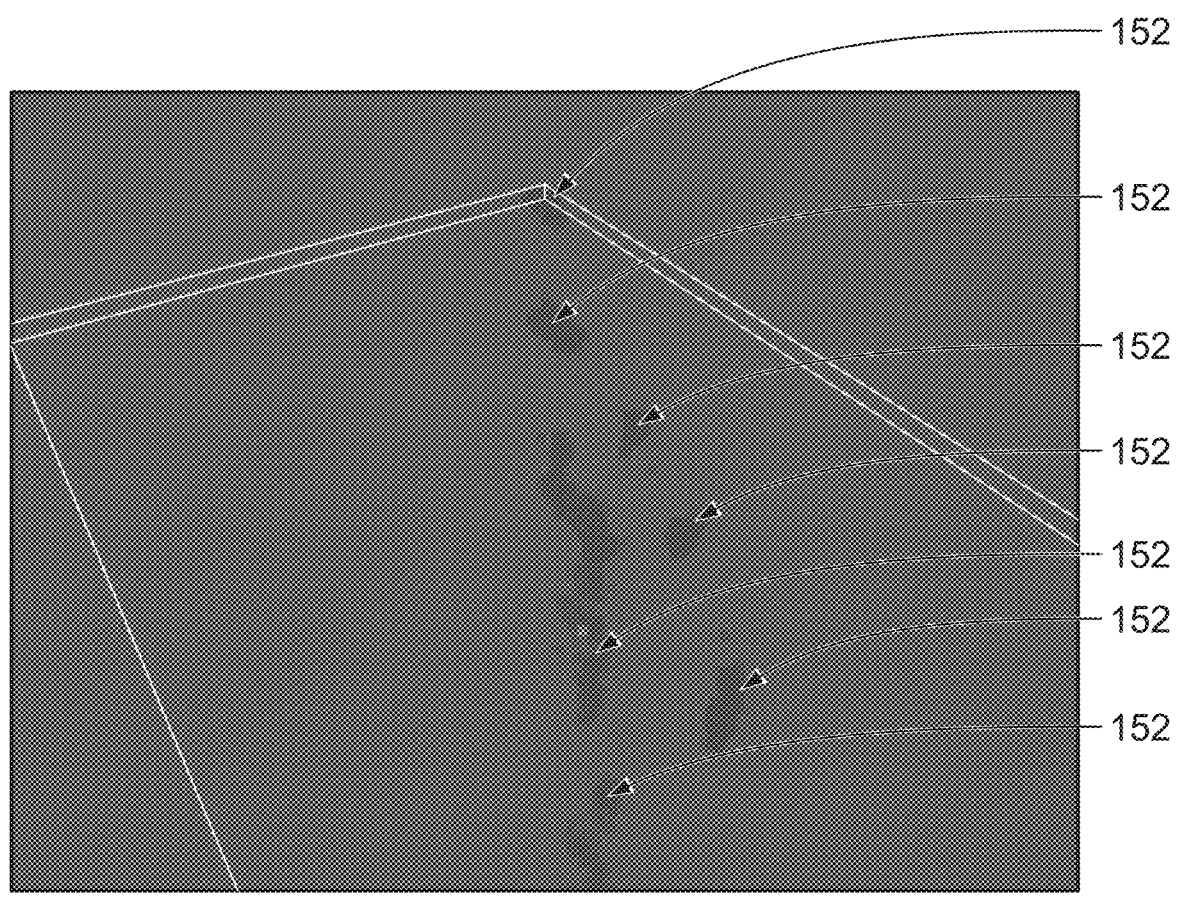
FIGS. 14A-15B are illustrations showing results produced by the system of the present disclosure.
Figure 14B:
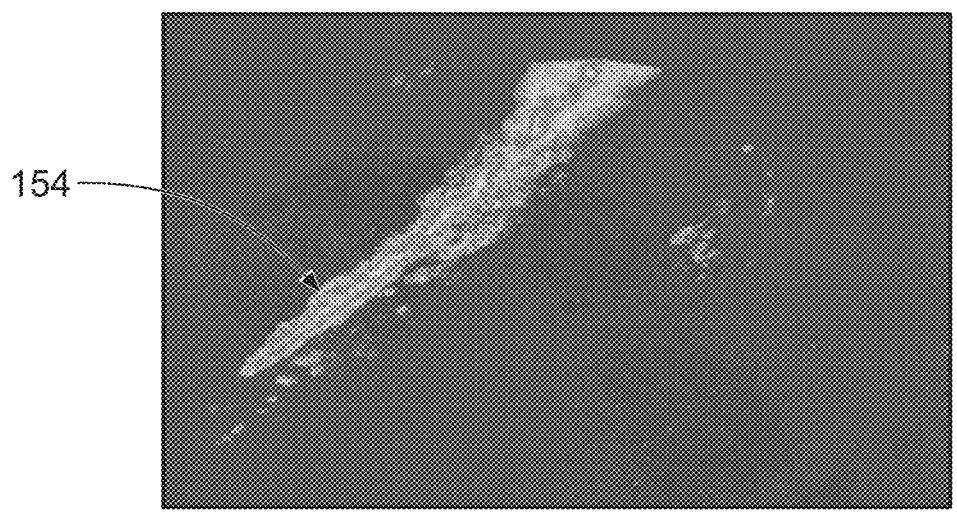

FIGS. 14A-14B are illustrations showing results produced by the present system. Specifically, FIG. 14A shows an output generated by the polarimetric hail size algorithm with hail cores indicated at 152. FIG. 14B shows a radar map with a squall line 154, and a storm cell distribution within the squall line 154 confirming the hail cores.

Figure 15A:
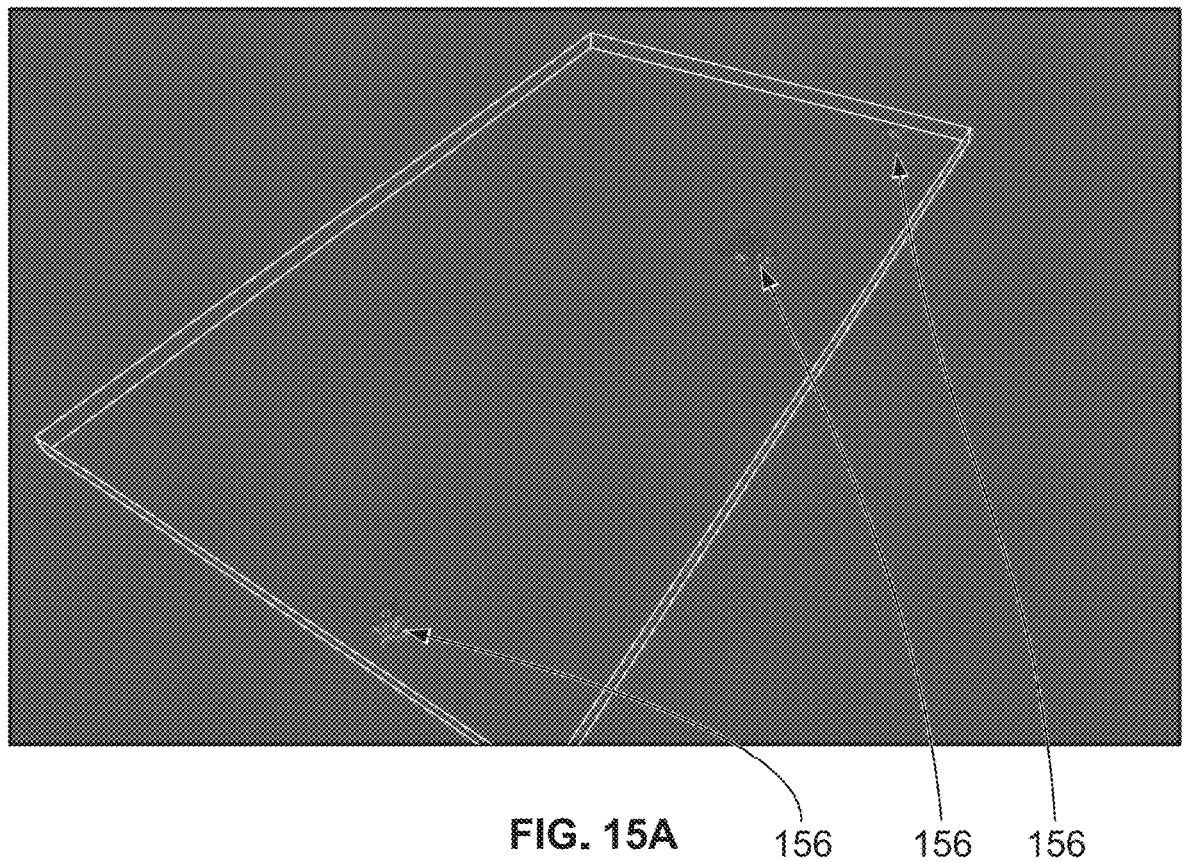
Figure 15B:
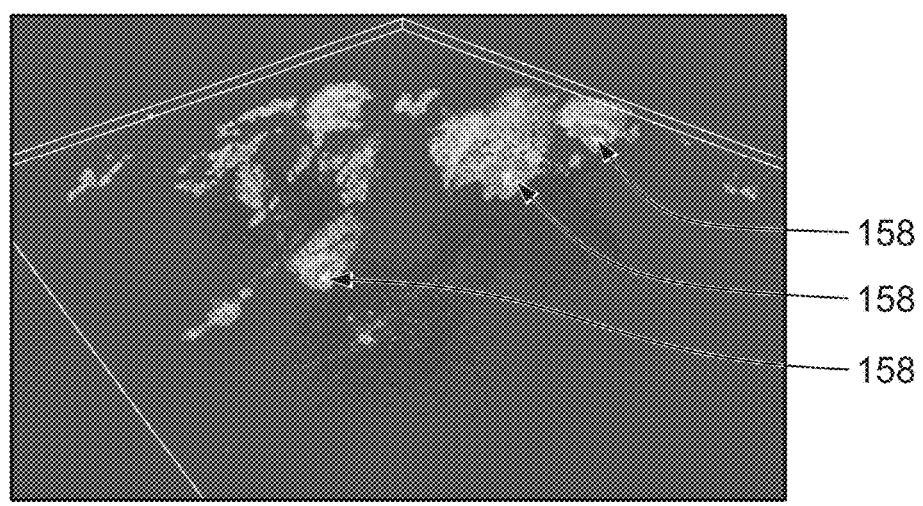

FIGS. 15A-15B are illustrations showing further results produced by the present system. Specifically, FIG. 15A shows an output generated by the polarimetric hail size algorithm with hail cores indicated at 156. FIG. 15B shows a radar map with three storm cells 158 matching the hail cores.

Figure 16:
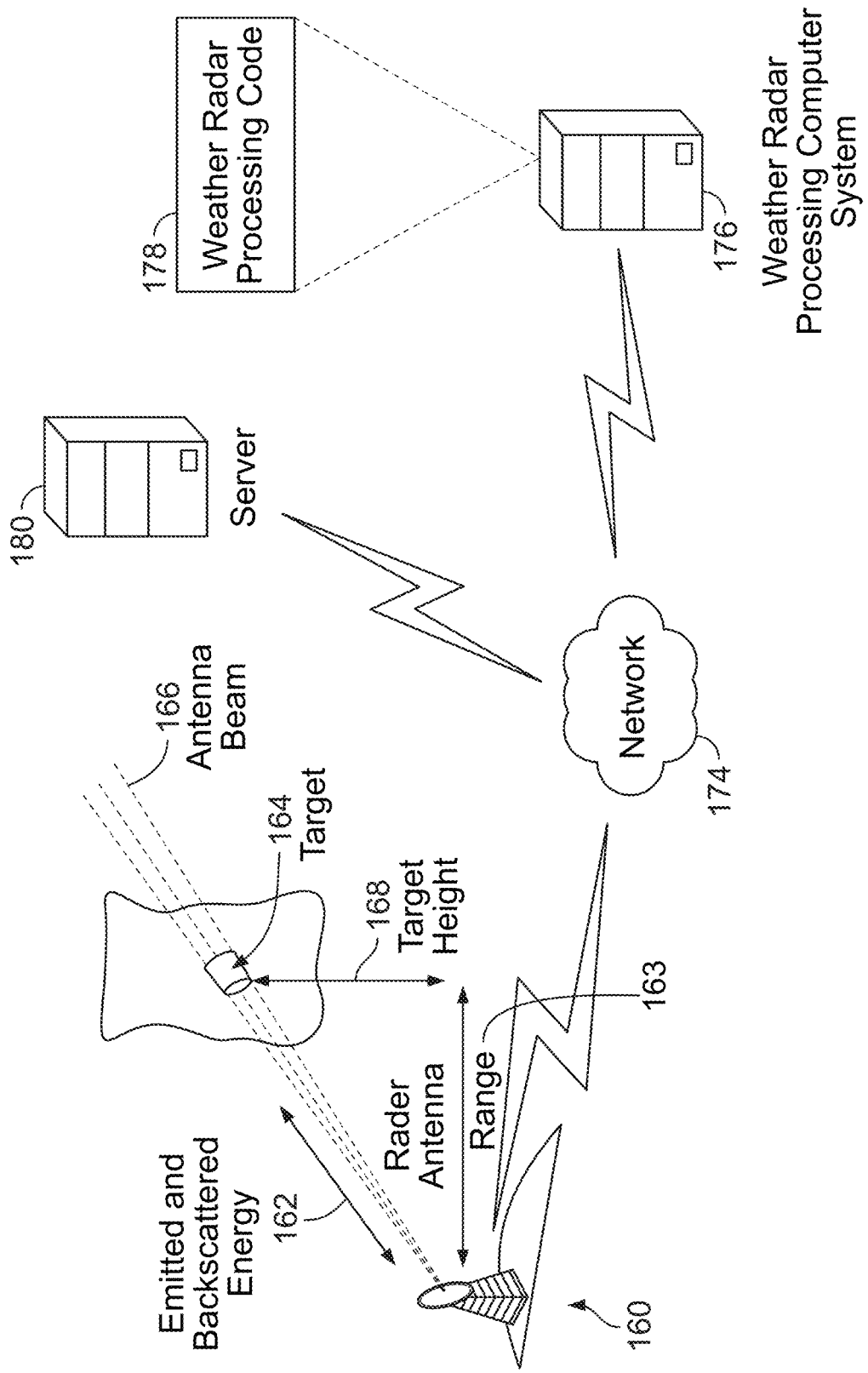
FIG. 16 is a diagram illustrating sample hardware and software components capable of being used to implement the system of the present disclosure.

FIG. 16 is a diagram showing a hardware and software components on which the system of the present disclosure can be implemented. The system includes a radar station 160, a network 174, a weather radar processing computer system 176, and, optionally, a server 180. The radar station 160 emits an antenna beam 166 towards a target 164. Backscattered energy 162 from the target 164 returns to the radar station 160, which allows the radar station 160 to determine a range 163 and height 168 of the target 164. The radar station 160 transmits data relating to the target 164 to the weather radar processing computer system 176 for processing in accordance with the present disclosure, and optionally, to the server 180 via the network 174.

The network 174 can be any type of wired or wireless network, including but not limited to, a legacy radio access network ("RAN"), a Long Term Evolution radio access network ("LTE-RAN"), a wireless local area network ("WLAN"), such as a WiFi network, an Ethernet connection, or any other type network used to support communication. The server 180 can be any type of server/program used to provide a user a remote storage system, a cloud computing service (e.g., Microsoft® Azure, Amazon® Web Services, etc.), etc. The weather radar processing computer system 176 could communicate with the server 180 via the network 174.

The weather radar processing computer system 176 can include a storage device, weather radar processing code 178, a network interface, a communications bus, a central processing unit (CPU) (microprocessor), a random access memory (RAM), and one or more input devices, such as a keyboard, mouse, etc. The weather radar processing computer system 176 could also include a display (e.g., liquid crystal display (LCD), cathode ray tube (CRT), etc.). The storage device could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The weather radar processing computer system 176 could be a networked computer system, a personal computer, a server, a smart phone, tablet computer etc. It is noted that the server need not be a networked server, and indeed, could be a stand-alone computer system.

The functionality provided by the present disclosure could be provided by weather radar processing code 178, which could be embodied as computer-readable program code stored on the storage device and executed by the CPU using any suitable, high or low level computing language, such as Python, Java, C, C++, C#, .NET, MATLAB, etc. The network interface could include an Ethernet network interface device, a wireless network interface device, or any other suitable device which permits the server to communicate via the network 174. The CPU could include any suitable single-core or multiple-core microprocessor of any suitable architecture that is capable of implementing and running the weather radar processing code (e.g., Intel processor). The random access memory could include any suitable, high-speed, random access memory typical of most modern computers, such as dynamic RAM (DRAM), etc.

Advantageously, the present disclosure provides a weather radar and weather model data processing system that is capable of performing various quality-control functions before computing and producing multiple output products, by performing calculations on input data represented in a point cloud structure before converting the data to a gridded data structure using cloud computing and efficient programming functions. The point cloud structure preserves more data for longer, resulting in the possibility of a more accurate estimate from the output product, whether that be hail size, hail probability, etc. This can be accomplished by receiving weather radar data, converting the weather radar data into a point cloud structure, processing the point cloud structure to generate predicted weather data, converting the predicted weather data to a gridded data structure, and outputting the gridded data structure. Additionally, a quality-control check function can be performed on the weather radar data.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure.

The invention claimed is:

1. A system for weather radar processing, comprising:
   a processor in communication with a first database and a second database; and
   computer system code executed by the processor, the computer system code causing the processor to:
   ingest native polar coordinate radar data from the first database, the native polar coordinate radar data comprising a full volume scan obtained from a radar product generator in real-time communication with the processor;
   ingest numerical weather prediction data from the second database;
   process the native polar coordinate radar data and the numerical weather prediction data to generate weather products on defined tiles;
   process the weather products on the defined tiles into full domain weather products by stitching the defined tiles together;
   generate time aggregated data based on the full domain weather products; and
   generate a final model using the time aggregation data.

2. The system of claim 1, wherein the native polar coordinate radar data is collected into a radar volume and stored in a cloud storage system.

3. The system of claim 1, wherein the processor performs polarimetric processing of the native polar coordinate radar data to generate processed radar data, comprising:
   adjusting a system phase using a ray-by-ray external scatter method to determine an initial system differential phase; and
   generating differential phase data using an unfolding process.

4. The system of claim 3, wherein the processor performs a quality control check on the processed radar data, comprising de-aliasing Doppler velocities and removing non-meteorological return from the processed radar data using a MetSignal algorithm.

5. The system of claim 4, wherein the MetSignal algorithm comprises a weighed fuzzy logic which outputs a single meteorological signal class.

6. The system of claim 4, wherein the quality check further comprises the processor applying a melting layer detection algorithm to develop a mask for bins contaminated by a melting layer.

7. The system of claim 1, wherein the processor calculates a polarimetric hail size using a polarimetric hail size algorithm.

8. The system of claim 7, wherein the processor generates different masks for different hail sizes to compute hail durations.

9. The system of claim 7, wherein the polarimetric hail size algorithm comprises the processor performing steps of:
calculating membership function at different height intervals;
generating fuzzy logic categories by outputting score results of the membership functions into one or more categories; and
de-fuzzifing logic maps to one or more distinct hail sizes.

10. The system of claim 9, wherein the processor de-fuzzifies the logic maps by translating categorical results from a membership value space to a quantitative size value.

11. A method for weather radar processing, comprising;
ingesting native polar coordinate radar data from a first database, the native polar coordinate radar data comprising a full volume scan obtained in real time from a radar product generator;
ingesting numerical weather prediction data from a second database;
processing the native polar coordinate radar data and the numerical weather prediction data to generate weather products on defined tiles;
processing the weather products on the defined tiles into full domain weather products by stitching the defined tiles together;
generating time aggregated data based on the full domain weather products; and
generating a final model using the time aggregation data.

12. The method of claim 11, wherein the native polar coordinate radar data is collected into a radar volume and stored in a cloud storage system.

13. The method of claim 11, further comprising performing polarimetric processing of the native polar coordinate radar data to generate processed radar data, comprising:
adjusting a system phase using a ray-by-ray external scatter method to determine an initial system differential phase; and
generating differential phase data using an unfolding process.

14. The method of claim 13, further comprising performing a quality control check on the processed radar data, comprising de-aliasing Doppler velocities and removing non-meteorological return from the processed radar data using a MetSignal algorithm.

15. The method of claim 14, wherein the MetSignal algorithm comprises a weighed fuzzy logic which outputs a single meteorological signal class.

16. The method of claim 14, wherein the quality check further comprises applying a melting layer detection algorithm to develop a mask for bins contaminated by a melting layer.

17. The method of claim 11, further comprising calculating a polarimetric hail size using a polarimetric hail size algorithm.

18. The method of claim 17, further comprising generating different masks for different hail sizes to compute hail durations.

19. The method of claim 17, wherein the polarimetric hail size algorithm comprises the performing steps of:
calculating membership function at different height intervals;
generating fuzzy logic categories by outputting score results of the membership functions into one or more categories; and
de-fuzzifing logic maps to one or more distinct hail sizes.

20. The method of claim 19, further comprising de-fuzzifing the logic maps by translating categorical results from a membership value space to a quantitative size value.

21. The method of claim 11, further comprising:
converting the radar data into a point cloud structure;
processing the point cloud structure to generate predicted weather data;
concerting the predicted weather data to a gridded data structure; and
outputting the gridded data structure.

22. The method of claim 21, further comprising performing a quality-control check function on the radar data.

* * * * *